K. E. KERSTEN.

BEATER BELT FOR HOG SCRAPERS.

APPLICATION FILED JAN. 23, 1922.

Reissued Mar. 28, 1922.

15,318.

2 SHEETS—SHEET 1.

INVENTOR.

Karl E. Kersten

BY Wm F. Freudenreich

ATTORNEY.

K. E. KERSTEN.

BEATER BELT FOR HOG SCRAPERS.

APPLICATION FILED JAN. 23, 1922.

Reissued Mar. 28, 1922.

15,318.

2 SHEETS—SHEET 2.

INVENTOR.
Karl E. Kersten
BY
Wm. F. Frendenreich
ATTORNEY.

UNITED STATES PATENT OFFICE.

KARL E. KERSTEN, OF CHICAGO, ILLINOIS.

BEATER BELT FOR HOG SCRAPERS.

15,318. Specification of Reissued Letters Patent. Reissued Mar. 28, 1922.

Original No. 1,329,529, dated February 3, 1920, Serial No. 316,066, filed August 8, 1919. Application for reissue filed January 23, 1922. Serial No. 531,278.

*To all whom it may concern:*

Be it known that I, KARL E. KERSTEN, a citizen of the United States, residing at Chicago, in the county of Cook and State of Illinois, have invented a certain new and useful Improvement in Beater Belts for Hog Scrapers, and declare the following to be a full, clear, and exact description of the same, such as will enable others skilled in the art to which it pertains to make and use the same, reference being had to the accompanying drawings, which form a part of this specification.

A device that is widely used for removing hair from hog carcasses consists of a rapidly revolving shaft having radially projecting arms to which are attached beater belts carrying scraping knives or blades. The belts are usually made of canvas and rubber; the canvas being in several layers. In order that the knives or blades may do their work properly it is necessary that the supporting belts be made quite stiff so as not to yield too easily under the impact of the blows which they deliver when in use. On account of their stiffness the rapidly moving belts act very much like rigid members hinged at their inner ends, thus producing comparatively sharp bends in the belts immediately at the ends of the arms to which they are attached. The effect of these sharp bends is to subject some of the layers of the belts to heavy stresses which soon bring about the destruction of such layer and thus end the usefulness of the belts.

The object of the present invention is to produce a simple and novel belt construction which will obviate injury to a beater belt in the manner just explained and thus greatly increase the life of the beater belt.

The various features of novelty whereby my invention is characterized will hereinafter be pointed out in the claims; but, for a full understanding of my invention and of its object and advantages, reference may be had to the following detailed description taken in connection with the accompanying drawings, wherein:

Figure 1:
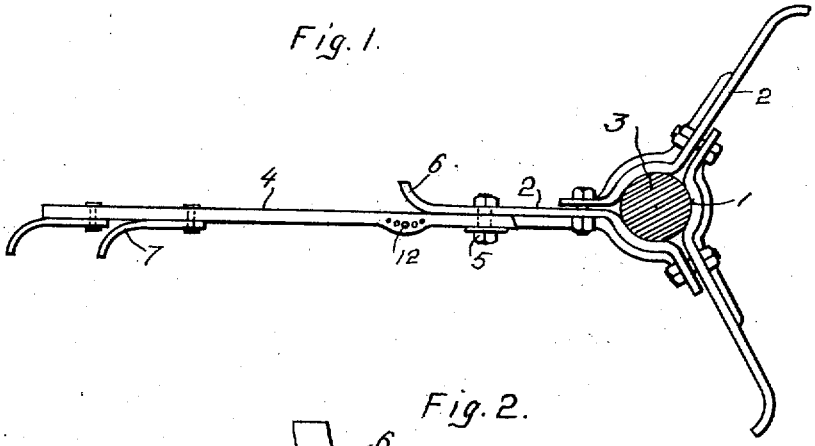
Figure 1 is a plan view of a supporting spider or beater belt, one of my improved belts being shown in place, and the supporting shaft being shown in section.
Figure 2:
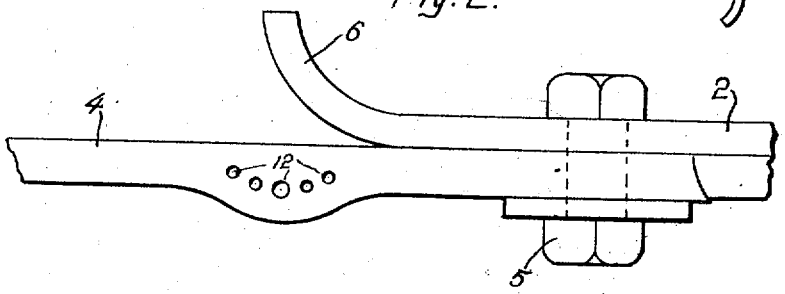
Fig. 2 is a plan view on a larger scale of the outer end of one of the arms of the spider and the inner end of the beater belt carried thereby.

Referring to the drawings, 1 represents a spider or frame having arms, 2, projecting radially therefrom. The spider is adapted to be rigidly clamped on a rotary shaft 3. 4 represents a beater belt whose inner end overlaps the outer end of one of the arms 2 and is secured thereto in any suitable manner, as, for example, by means of a bolt or bolts, 5. As is usual in devices of this kind, the extreme outer end of the supporting arm is gradually deflected away from the belt to produce a rounded shoulder, 6, or seat, over which the belt may bend when required to yield upon striking the carcass which is being operated upon.

All the parts heretofore described, except for the particular features to which attention will hereinafter be directed, constitute a well known device or apparatus which has been selected simply to illustrate the principle of my invention and not for the purpose of limiting the invention to the details thereof.

When in use the device is rotated in the counter clockwise direction as viewed in Fig. 1, the free end of the belt, carrying the knives or blades, 7, striking the carcass which is being operated upon and being deflected so as to make a sliding stroke along the carcass. On account of the stiffness of the belt the deflection will be produced, in the main, by the creation of a comparatively sharp bend over the shoulder, 6, and it is at this point where the belt wears out quickly, because of the enormous stretching stresses to which the fabric is subjected.

Figure 3:
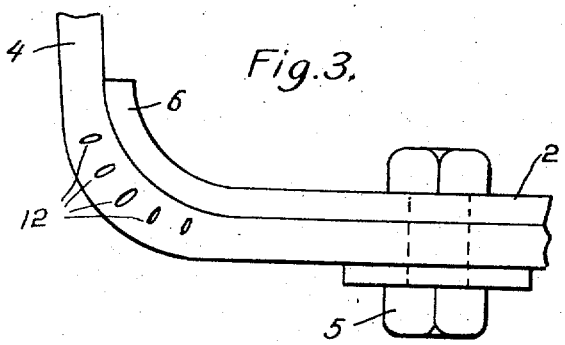
Fig. 3 is a view similar to Fig. 2, showing the belt bent back as its free end is being dragged along a carcass.
Figure 4:
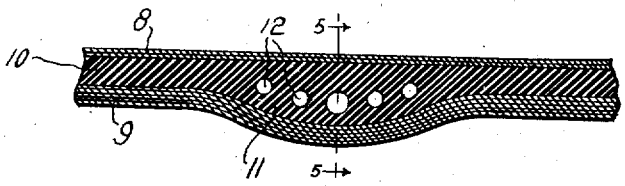
Fig. 4 is a longitudinal section through the belt in the vicinity of the outer end of the supporting arm.
Figure 5:
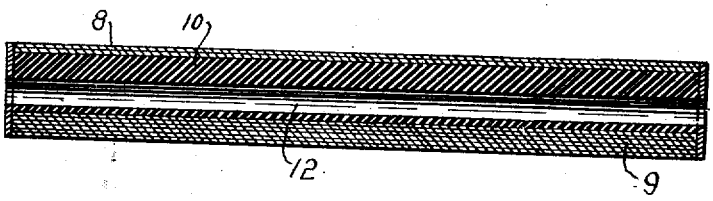
Fig. 5 is a section taken approximately on line 5—5 of Fig. 4.

In accordance with my invention I so construct belts of this kind that provision is made at the points where they must bend sharply to enable them to bend without unduly stressing the fabric on the faces or sides that are placed under tension. This is accomplished, as best seen in Figs. 4 and 5, by placing between one or more back layers of fabric, 8, and a pile, 9, of front layers of fabric a layer, 10, of cushioning material, preferably rubber, so constructed that it will be quite yieldable in that zone, 11, in which the sharpest bend in the belt occurs when the belt is in use. Therefore when the belt is bent, as illustrated in Fig. 3, there is sufficient compression of the cushion at the bend to permit the front layers readily to adjust themselves to the convexity of the front face of the belt without being strained. If the cushioning layer is thickened in the zone, 11, so as to produce a forward bulge, this will cause the pile of front layers to curve outwardly and make the length of the front layers greater than that of the back layer or layers; this excess length being all placed where the demand for increased length comes when the belt is sharply bent as heretofore explained. With this arrangement, when the belt is called upon to bend in actual practice, the cushioning material permits the lump or bulge to flatten out and thus permit the excess material in the front layers to compensate for the increased overall length of the belt on the convex side due to the bend. Consequently the stresses tending to disrupt the front layers of the ordinary belt and tear the layers apart are either largely avoided or practically dissipated in the cushion. The bulge gives the added advantage of permitting the cushioning layer to be made comparatively thin throughout the remainder of the belt.

Figure 6:
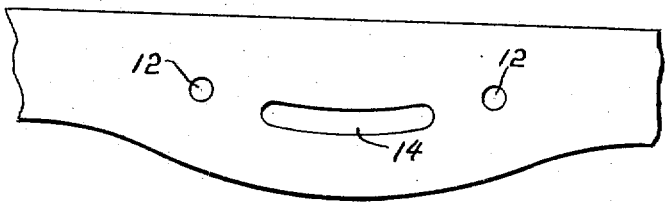
Fig. 6 is an edge view of that part of the belt shown in Fig. 4, but on a larger scale, illustrating a modification.

If desired, the cushioning layer may be made more yieldable in the zone 11 than at other points, so as to make it certain that there will be the requisite amount of compression of the cushioning layer in this zone to give the desired results. To this end chambers or hollows may be formed in the cushioning layer in the zone 11. This may conveniently be accomplished, for example, by extending a series of holes, 12, transversely through the cushion or, as shown in Fig. 6, by cutting elongated slots, 14, through this part of the cushion, or by a combination of slots and holes. The holes or the holes and slots will close more or less during the bending of the belt, thus securing the desired compression of the cushion long before there is any danger of subjecting the elements of the belt to injurious stresses.

While I have illustrated and described in detail a single preferred form of my invention with slight modifications, I do not desire to be limited to the particular details so illustrated and described; but intend to cover all forms and arrangements which come within the terms of the definitions of my invention constituting the appended claims.

I claim:

1. A beater belt comprising front and back layers and an intervening cushioning layer, said cushioning layer being sufficiently yieldable at the point where the sharpest bend will occur in use to compress readily and thus permit the front and back layers to adjust themselves relatively to each other at the bend without being strained.

2. A beater belt comprising front and back layers and an intervening cushioning layer, said cushioning layer being thickened at a point where a sharp bend in the belt will occur in use, the thickening being in a direction and of an extent to produce a forward bulge extending entirely across the belt on the front side thereof.

3. A beater belt comprising front and back layers and an intervening cushioning layer, said cushioning layer having air chambers therein in the zone where a sharp bend in the belt will occur in use.

4. A beater belt comprising front and back fabric layers and an intervening layer of rubber, said layer of rubber having a chambered forward bulge causing a forward bulge in the front fabric layers at a point where a sharp bend occurs in the belt during use.

5. A beater belt containing a layer of flexible non-extensible material and a cushioning layer behind and co-extensive with the same, said cushioning layer being sufficiently yieldable at a point where the sharpest bend will occur in use to compress radially and thus reduce the stresses in the first mentioned layer when the belt is bent backwards at said point.

6. A beater belt containing a non-extensible front layer and a cushioning layer behind the same, said cushioning layer being thickened at a point where a sharp bend in the belt will occur in use, the thickening being in a direction and of an extent to produce a forward bulge in the front layer extending entirely across the belt on the front side thereof when the belt is in its normal flat condition.

7. A beater belt containing a front layer of fabric and a cushioning layer of rubber behind the same, said layer of rubber being thickened at a point where a sharp bend in the belt will occur in use, the thickening being in a direction and of an extent to produce a forward bulge extending entirely across the belt on the front side thereof.

8. A beater belt containing a front layer of flexible non-extensible material and a cushioning layer behind the same, said cushioning layer having air chambers therein in the zone where a sharp bend in the belt will occur in use.

In testimony whereof I sign this specification.

KARL E. KERSTEN.